United States Patent
Winter et al.

(10) Patent No.: US 7,263,595 B2
(45) Date of Patent: Aug. 28, 2007

(54) REPRODUCTION APPARATUS HAVING A BUFFER FOR REDUCING THE MEAN ACCESS TIME TO AN INFORMATION CARRIER

(75) Inventors: Marco Winter, Hannover (DE); Axel Kochale, Springe (DE)

(73) Assignee: Thomson Licensing, Boulogne-Billancourt (FR)

( * ) Notice: Subject to any disclaimer, the term of this patent is extended or adjusted under 35 U.S.C. 154(b) by 416 days.

(21) Appl. No.: 10/499,601

(22) PCT Filed: Dec. 5, 2002

(86) PCT No.: PCT/EP02/13783

§ 371 (c)(1),
(2), (4) Date: Jun. 17, 2004

(87) PCT Pub. No.: WO03/052760

PCT Pub. Date: Jan. 26, 2003

(65) Prior Publication Data

US 2005/0071548 A1    Mar. 31, 2005

(30) Foreign Application Priority Data

Dec. 17, 2001    (DE) ................................ 101 62 046

(51) Int. Cl.
*G06F 12/00* (2006.01)
(52) U.S. Cl. .................................................... 711/208
(58) Field of Classification Search ...................... None
See application file for complete search history.

(56) References Cited

U.S. PATENT DOCUMENTS 5,029,125 A    7/1991    Sciupac (Continued)

FOREIGN PATENT DOCUMENTS

EP    284664    10/1988

(Continued)

OTHER PUBLICATIONS

Patent Abstracts of Japan, vol. 014, No. 516, Nov. 13, 1990 & JP 2-214924 (See Ref. AE).

(Continued)

*Primary Examiner*—Matthew Kim
*Assistant Examiner*—Ryan A. Dare
(74) *Attorney, Agent, or Firm*—Joseph J. Laks; Robert D. Shedd; Reitseng Lin

(57) ABSTRACT

The invention relates to a reproduction apparatus having a buffer for reducing the mean access time to an information carrier which has for example a discontinuous data structure or a relatively long access time. For writing sectors to the buffer and for finding sectors in the buffer, a control table with a number of place holders and three variables is provided, the place holders in each case pointing with an index to a subsequent place holder in an endless chain of place holders which is divided into three regions, in which a predetermined sector in the order in the respective region is identified by one of the variables. Even though only one row of place holders is provided, multiple access to a plurality of sectors written to the buffer is made possible with a low outlay by means of the control table, so that the number of slower accesses to the information carrier is reduced and the mean access time is shortened. Application is envisaged for reproduction apparatuses with a small storage space, such as, for example, a DVD reproduction apparatus.

14 Claims, 8 Drawing Sheets

U.S. PATENT DOCUMENTS

Figure 1:
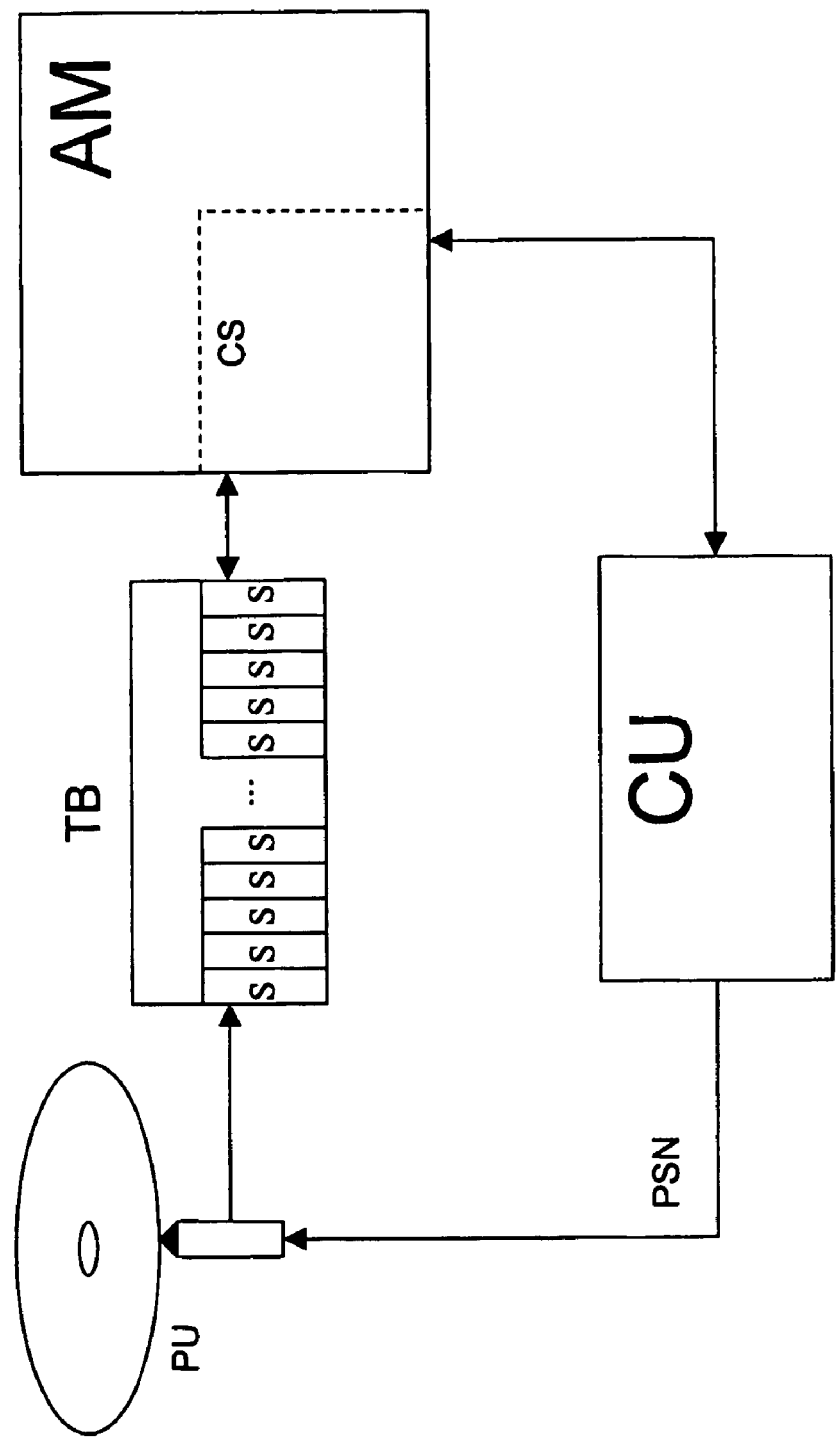

| | | | |
|---|---|---|---|
| 5,404,511 A * | 4/1995 | Notarianni | 707/1 |
| 5,638,506 A | 6/1997 | Peterson et al. | |
| 5,960,452 A | 9/1999 | Chi | |
| 6,292,625 B1 * | 9/2001 | Gotoh et al. | 386/95 |
| 2003/0120879 A1 * | 6/2003 | Chen et al. | 711/154 |

FOREIGN PATENT DOCUMENTS

| | | |
|---|---|---|
| EP | 917144 | 5/1999 |
| JP | 2-214924 | 8/1990 |
| WO | WO 01/46792 | 6/2001 |

OTHER PUBLICATIONS

Copy of Search Report dated Feb. 17, 2003.

* cited by examiner

| z | PHN 0 | 1 | 2 | 3 | 4 | 5 | | la | lf | lu |
|---|---|---|---|---|---|---|---|---|---|---|
| 1 | | | | | | | | * | * | 0 |
| 2 | 1 | | | | | | | 0 | * | 1 |
| 3 | 2 | 0 | | | | | | 1 | * | 2 |
| 4 | 2 | 0 | | | | | | 1 | 0 | 2 |
| 5 | 2 | 0 | | | | | | * | 1 | 2 |
| 6 | 3 | 0 | 1 | | | | | 2 | 1 | 3 |
| 7 | 4 | 0 | 1 | 2 | | | | 3 | 1 | 4 |
| 8 | 4 | 0 | 3 | 1 | | | | 2 | 3 | 4 |
| 9 | 5 | 0 | 3 | 1 | 2 | | | 4 | 3 | 5 |
| 10 | 5 | 0 | 3 | 1 | 2 | 4 | | 5 | 3 | * |
| 11 | 3 | 0 | 1 | 5 | 2 | 4 | | 3 | 1 | * |
| 12 | 1 | 3 | 0 | 5 | 2 | 4 | | 1 | 0 | * |
| 13 | 1 | 3 | 4 | 5 | 0 | 2 | | 1 | 4 | * |
| 14 | 1 | 3 | 4 | 5 | 0 | 2 | | 0 | 4 | * |
| 15 | 1 | 3 | 4 | 5 | 0 | 2 | | 4 | * | * |

Left side row labels: in #0, in #1, del #0, del #1, in #2, in #3, del #3, in #4, in #5, in #3, ru #1, del #4, ru #0, ru #4

Top labels: CS, PHN

Fig. 6

Fig. 7

|  | PHN | | | | | | CS | la | lf | lu | na | nf | nu |
|---|---|---|---|---|---|---|---|---|---|---|---|---|---|
| z | 0 | 1 | 2 | 3 | 4 | 5 | | | | | | | |
| 1 | 1 | 2 | 3 | 4 | 5 | 0 | | 0 | 0 | 0 | 0 | 0 | 6 |
| in #0 2 | 1 | 2 | 3 | 4 | 5 | 0 | | 0 | 1 | 1 | 1 | 0 | 5 |
| in #1 3 | 2 | 0 | 3 | 4 | 5 | 1 | | 1 | 2 | 2 | 2 | 0 | 4 |
| del #0 4 | 2 | 0 | 3 | 4 | 5 | 1 | | 1 | 0 | 2 | 1 | 1 | 4 |
| del #1 5 | 2 | 0 | 3 | 4 | 5 | 1 | | 1 | 1 | 2 | 0 | 2 | 4 |
| in #2 6 | 3 | 0 | 1 | 4 | 5 | 2 | | 2 | 1 | 3 | 1 | 2 | 3 |
| in #3 7 | 4 | 0 | 1 | 2 | 5 | 2 | | 3 | 1 | 4 | 2 | 2 | 2 |
| del #3 8 | 4 | 0 | 3 | 1 | 5 | 2 | | 2 | 3 | 4 | 1 | 3 | 2 |
| in #4 9 | 5 | 0 | 3 | 1 | 2 | 4 | | 4 | 3 | 5 | 2 | 3 | 1 |
| in #5 10 | 5 | 0 | 3 | 1 | 2 | 4 | | 5 | 3 | 5 | 3 | 3 | 0 |
| in #3 11 | 3 | 0 | 1 | 5 | 2 | 4 | | 3 | 1 | 3 | 4 | 2 | 0 |
| ru #1 12 | 1 | 3 | 0 | 5 | 2 | 4 | | 1 | 0 | 1 | 5 | 1 | 0 |
| del #4 13 | 1 | 3 | 4 | 5 | 0 | 2 | | 1 | 4 | 1 | 4 | 2 | 0 |
| ru #0 14 | 1 | 3 | 4 | 5 | 0 | 2 | | 0 | 4 | 0 | 5 | 1 | 0 |
| ru #4 15 | 1 | 3 | 4 | 5 | 0 | 2 | | 4 | 4 | 4 | 6 | 0 | 0 |

Fig. 8

| z | PHN 0 | 1 | 2 | 3 | 4 | 5 | | la | lf | lu |
|---|---|---|---|---|---|---|---|---|---|---|
| 1 | | | | | | 0 | | * | * | 5 |
| 2 | 1 | | | | | 0 | | 5 | * | 0 |
| 3 | 2 | 0 | | | | 1 | | 5 | * | 0 |
| 4 | 2 | 0 | | | | 1 | | 5 | 1 | 0 |
| 5 | 2 | 0 | | | | 1 | | * | 5 | 0 |
| 6 | 3 | 0 | 1 | | | 2 | | 5 | 2 | 0 |
| 7 | 4 | 0 | 1 | 2 | | 3 | | 5 | 2 | 0 |
| 8 | 4 | 0 | 3 | 1 | | 2 | | 5 | 1 | 0 |
| 9 | 5 | 0 | 3 | 1 | 2 | 4 | | 5 | 1 | 0 |
| 10 | 5 | 0 | 3 | 1 | 2 | 4 | | 0 | 1 | * |
| 11 | 3 | 0 | 1 | 5 | 2 | 4 | | 0 | 2 | * |
| 12 | 1 | 3 | 0 | 5 | 2 | 4 | | 0 | 2 | * |
| 13 | 1 | 3 | 4 | 5 | 0 | 2 | | 0 | 2 | * |
| 14 | 1 | 3 | 4 | 5 | 0 | 2 | | 4 | 2 | * |
| 15 | 1 | 3 | 4 | 5 | 0 | 2 | | 2 | * | * |

Fig. 9

REPRODUCTION APPARATUS HAVING A BUFFER FOR REDUCING THE MEAN ACCESS TIME TO AN INFORMATION CARRIER

This application claims the benefit, under 35 U.S.C. § 365 of International Application PCT/EP02/13783, filed Dec. 5, 2002, which was published in accordance with PCT Article 21(2) on Jun. 26, 2003 in English and which claims the benefit of German patent application No. 10162046.2, filed Dec. 17, 2001.

The invention relates to a reproduction apparatus having a buffer for reducing the mean access time to an information carrier which has for example a discontinuous data structure or relatively long access time.

The speed of a reproduction apparatus or drive often directs attention to a product. In the case of drives, in particular, faster also means louder and, on the other hand, very few drives actually achieve the maximum performance specified. Rather, what is more important for convenient operation is the average speed or the mean access time during the reading of DVD and CD media which have a discontinuous data structure or a relatively long access time. A drive which offers constantly high speeds here will also reliably reproduce audio and video files. In CD applications, the read head often jumps from one sector to another, for instance in order to load an intermediate sequence or the mission briefing during playing.

The access time can be reduced with faster read heads, also referred to as pick-ups. However, they are expensive and lead to an improvement only to a limited extent.

Buffer technology, also referred to as caching, is known in computer technology for reducing the mean access time or for accelerating the reproduction of a relatively slow storage medium. The cache is a high-speed buffer. It buffer-stores frequently used data stored on slower storage media. The effectiveness of the buffer is determined by its speed and the ratio in which data required by an application are available in the buffer and are found or still have to be retrieved from the slower storage medium. In principle, three types of buffers are differentiated:

In the case of a buffer which is also referred to as a direct mapped cache, each storage location is mapped on a single cache row which it shares with many other storage locations. Since there is only one possible place where the storage location can be buffer-stored, there is no searching to be done and the cache row either does or does not contain the storage information. Unfortunately, the direct mapped cache, which requires the least outlay, also has the poorest performance since there is only one place at which the address can be stored. The hit rate is relatively low since the requested data randomly have to be located at the first place in the row.

The fully associative cache has the best hit rate since each row in the cache can contain each address which is to be buffer-stored. This means that the problems occurring in the direct mapped cache disappear since there is not just a single row which an address has to use. However, this cache has the disadvantage that the cache has to be searched. More logic has to be added in order to determine which of the different rows is to be used in order to add a new entry. Normally, an algorithm is used which proceeds from the row recently used the least in order to decide which cache row is to be used. This means, however, that the outlay and the complexity of the system are increased. The third type of buffer—the multiway associative cache—is a compromise between the direct mapped and associative caches. The cache is divided into sets of "N" rows—"N" is normally 2, 4, 8, . . . , and each storage address can be buffer-stored in one of a plurality of rows. This improves the hit rate compared with direct mapped caches, without carrying out an extensive search, since "N" can be kept low. Nevertheless, both in a plurality of storage rows and an increased outlay for the control are necessary.

Therefore, it is an object of the invention to provide a reproduction apparatus having a buffer for reducing the mean access time to an information carrier which has for example a discontinuous data structure or a relatively long access time, which apparatus both requires a low outlay and ensures a short mean access time.

This object is achieved by means of features which are specified in the independent claim. Advantageous refinements are specified in dependent claims.

In accordance with one aspect of the invention, a reproduction apparatus is proposed having a buffer which requires a low outlay for controlling the buffer and which nevertheless reduces the mean access time and the number of accesses to the slower information storage medium. For this purpose, a buffer is provided which is accessed by means of a row or series of place holders, which are concatenated, and a small number of variables. The place holders are organized in a series or row and, nevertheless, access not just to the first sector, but rather access to a plurality of sectors in the buffer which were loaded from an information carrier into the buffer is made possible with just one row of place holders and variables. The row of place holders can be provided together with the row of variables in an application memory or directly in the buffer. In the case of the arrangement of the place holders in the application memory, each place holder corresponds to a storage location in the buffer and the place holders form, with the row of variables, a control table which is used to write the sectors to the buffer or read them from the buffer. The row of place holders is constructed in such a way that the place holders comprise, as information, in each case the index of the next place holder, as a result of which an endless chain is formed which is preferably divided into three regions. A variable respectively identifies an entry point into one of the regions. This entry point into the respective region is for example the first sector in the respective region. However, in order to reduce the jumps upon alteration of the index assigned to a place holder, it is also possible to use a sector in the preceding region as entry point. The aforementioned regions are the region of sectors in use, which are referred to as allocated sectors, the region of released sectors and the region of unallocated place holders. The sectors in the three regions are sorted in the temporal order in which they were transported into the cache or buffer. The present sector of a row part is thus the first sector of this row part. The sectors are sorted in the temporal order in which they were read from the information carrier, i.e. the sector read last is the first sector in this region and the last place holder in this region points to the first place holder in the following region. The released sectors are likewise sorted according to the time when these sectors were transmitted into the cache, e.g. if they were freed from allocation. The last sector which is accepted from the region of the allocated sectors into the region of the released sectors is then the first sector in the region of the released sectors. The last place holder in the region of the released sectors then points to the first place holder of the region of unallocated place holders. The unallocated place holders contain no sectors. In the region of unallocated place holders, an arbitrary order is possible, but it must be ensured that the last sector in the region of unallocated place holders points to the first place holder in the region of allocated sectors, in order to form the endless chain provided.

In order to shorten the initialization of the row or chain of place holders, it is provided that only the first next pointer is formed during the writing of the first sector. As a result, the next place holder to be allocated is already determined, so that initialization of further place holders is unnecessary, as a result of which the time required for initialization is significantly shortened.

In order to control the abovementioned three regions of place holders, essentially three variables are required which, in the respective region, identify a sector for entry into this region. However, in order to prevent a non-unambiguous state from occurring by virtue of the fact that a plurality of variables access the same entry, it is provided that the variables are given the opportunity to show that they do not identify any valid index value, or three further variables are additionally provided, of which one of the three can be derived from the other two.

If an application requests a sector containing information of the information carrier, firstly a check is made to determine whether the sector with the corresponding sector number is already situated in the cache. If the sector with the corresponding sector number is already situated in the cache, the buffer-stored sector is used, and if the corresponding sector is not situated in the cache, it is read into the cache from the information carrier. For the sector read, an index in the row of place holders and the corresponding variable are then set in the control table. This sector is identified as the present sector and it is allocated the first place holder in the region of allocated sectors. If the cache is already allocated a sector in the region of allocated sectors and unallocated place holders are still available, its index is used for the new sector and the index of the sector that was previously read in is increased by one, thereby preserving the endless chain of place holders. At the same time, the variable identifying the place holder in the region is accordingly altered. Before the storage of the new entry, the preceding place holder in the chain was the last place holder in the region of unallocated sectors or, if there is no place holder present in the region of unallocated sectors and at least one released sector is stored in the cache, the last sector, forming the oldest sector in the region of released sectors, is to be used. In other words, the last or oldest sector in the region of released sectors is physically released in order to form a place holder for the new sector.

If place holders are not available either in the region unallocated sectors or in the region of released sectors, in accordance with the principle of the chained place holders, the preceding place holder is used, which is the last place holder used in the region of allocated sectors, i.e. the oldest allocated sector. If the application subsequently desires an access to this sector, this sector must be reloaded.

This procedure is only practical if the application of the replaced old allocated sector is able to recognize that the sector is no longer immediately available, i.e. a reloading for a further sector access or an access to this sector constitutes an exception which automatically instigates reloading of this sector. If there is not enough memory available for allocating the row of place holders, the cache is switched off and the sector number is read directly from the information carrier.

If a sector in the region of allocated sectors is released, it is shifted to the first place in the region of released sectors, the length of the regions adapting dynamically to the number of sectors in the respective region on account of the predetermined concatenation.

All insertion and movement functions require only a change in the corresponding indices to the next place holders and a change in the variables. The disadvantages of the known types of buffer organization are avoided by dynamically concatenated buffer regions, so that, despite a single row, it is possible to access a plurality of sector addresses in the row, thereby reducing the number of direct accesses to the information carrier and, as a result, the mean access time.

The term access time denotes the time between request and provision of data, and is generally specified in milliseconds. The mean access time describes the time required on average for finding and reading an arbitrary item of information on a storage medium.

The proposed solution can advantageously be employed for small memories and for apparatuses having long access times, such as, for example, drives for optical storage media which have read heads having a long access time, since sectors which are present in the cache or are written to the cache upon request can be used directly from the cache without having to be accepted into the memory. What is more, the control of the cache requires a low outlay. Furthermore, the size of the cache is advantageously adapted to the storage space available in the memory since the number of place holders adapts to the respective requirements. The mean access time for information carriers with discontinuous data access or discontinuous data structure is reduced in particular by virtue of the fact that a sufficient volume of data is kept in the buffer and can be accessed directly without the need for returns to data already read from the information carrier. The number of accesses to sectors of optical storage media is reduced in the initialization phase, in particular by virtue of the fact that the so-called directory of file systems is to be read out a number of times and the corresponding data are made available by the buffer.

In the case of a recursive MP3 file search in an archive, by way of example, the entire directory tree of the storage medium is to be searched in its entirety, so that sectors already kept in the buffer can advantageously be used and the number of accesses to the storage medium and the number of read head returns are thereby reduced.

The corresponding sector number in the buffer is found in a known manner by comparison of request and sector found. Since a search in the concatenated buffer is significantly faster than the access to the information carrier and, by means of the concatenation, all the sectors in the buffer can accessed, the mean access time is reduced with a low outlay.

The invention is explained in more detail below with reference to exemplary embodiments in drawings.

Figure 2:
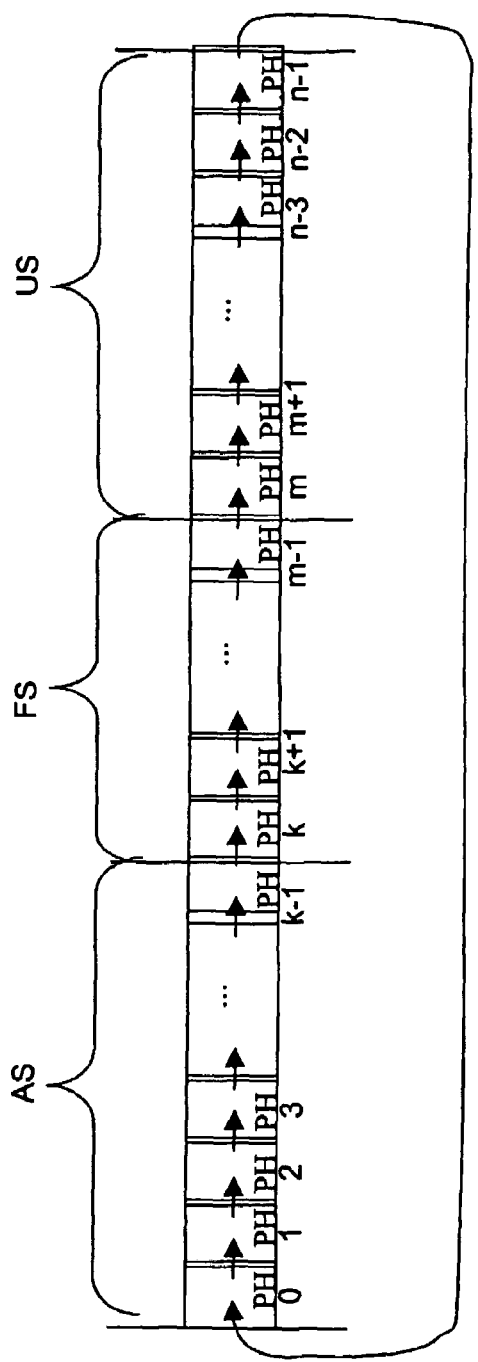
Figure 3:
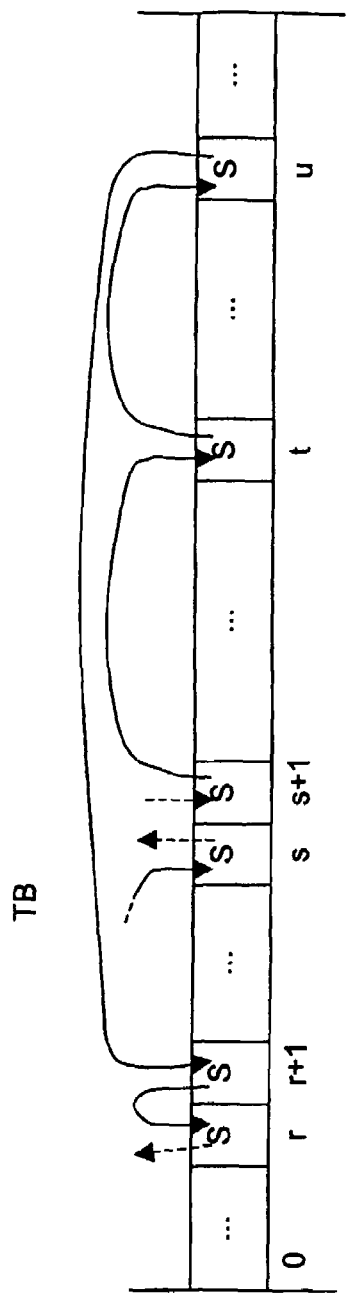
Figure 4:
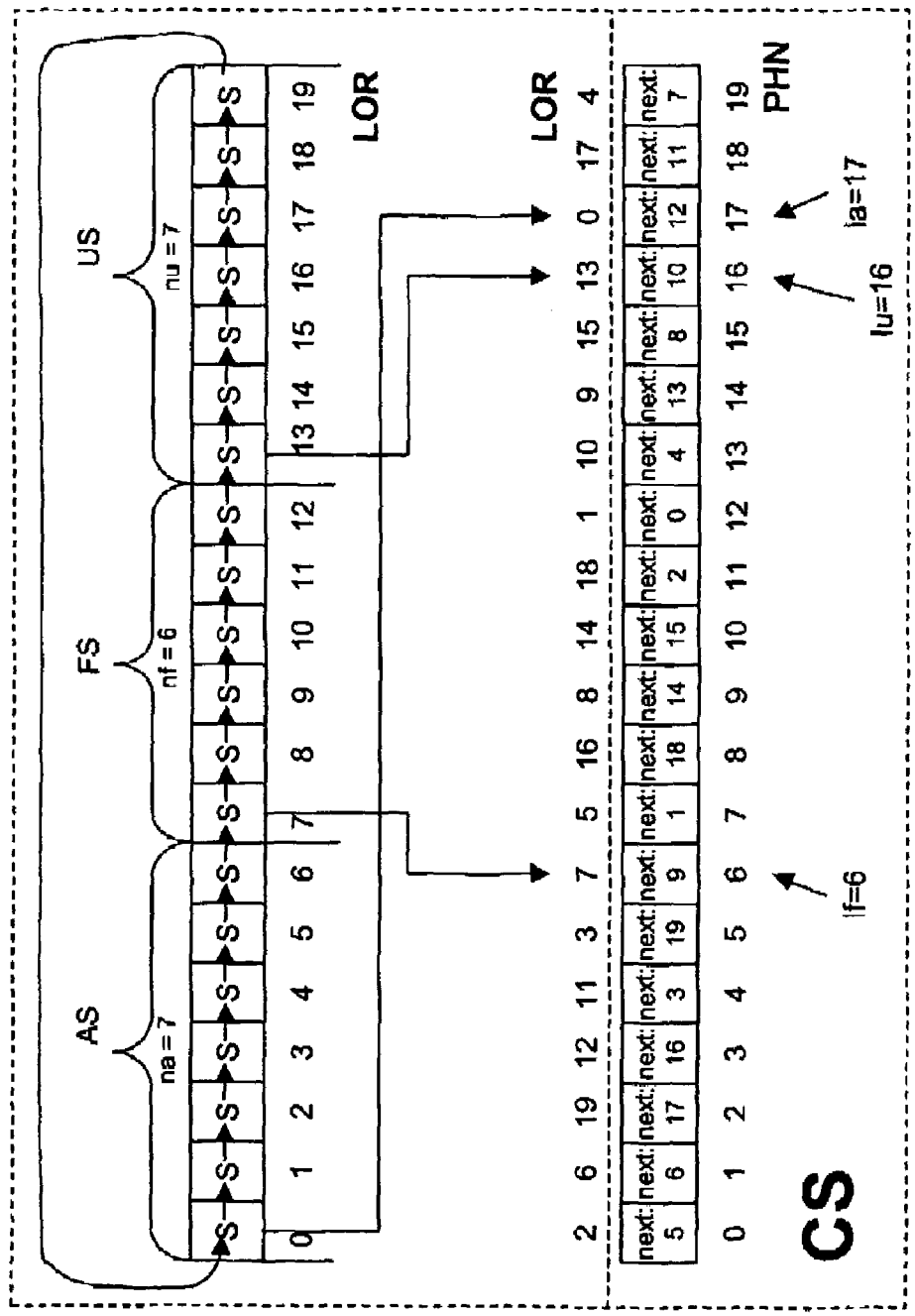
Figure 5:
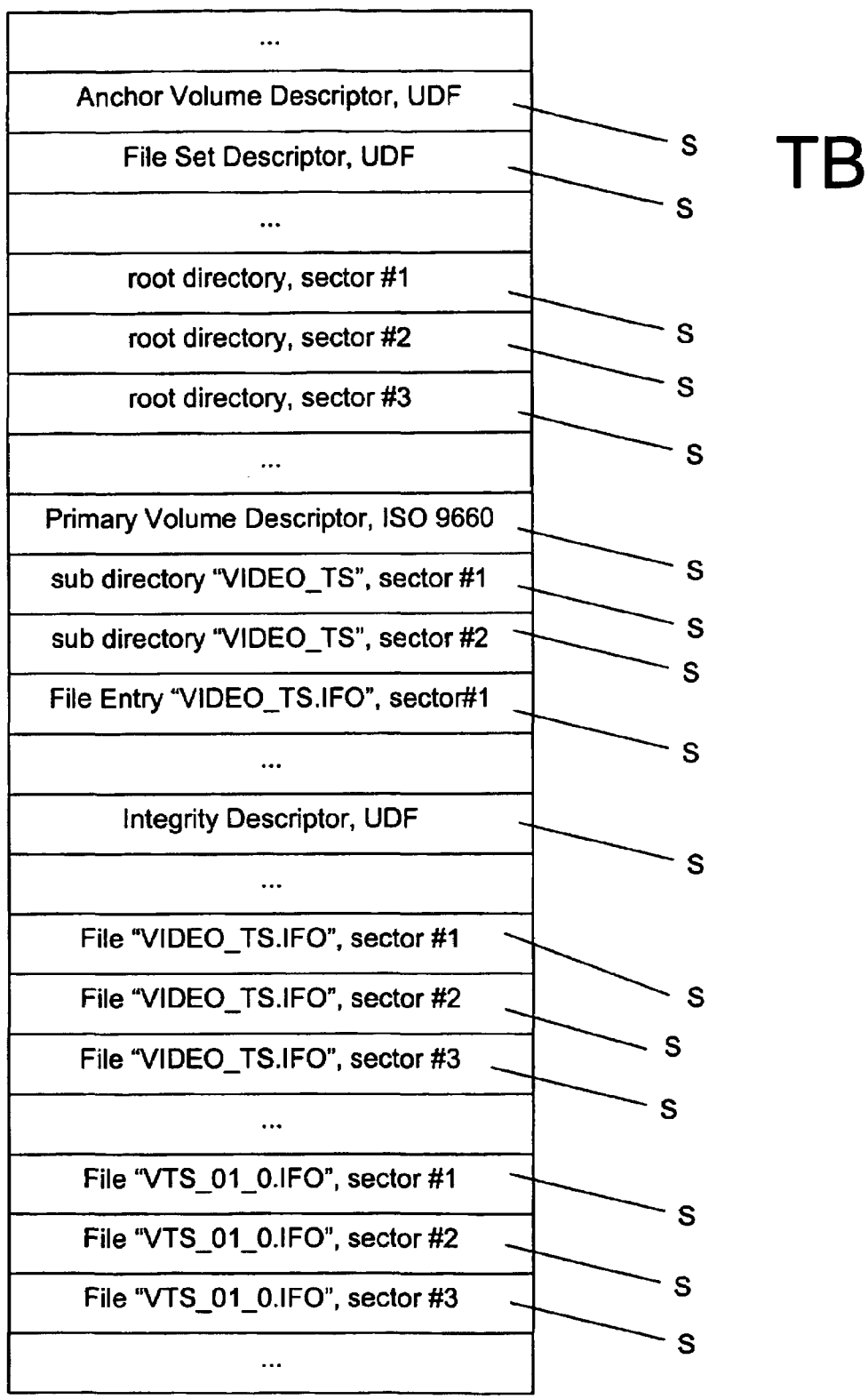

In the figures:

FIG. 1 shows a block diagram of a reproduction apparatus having a buffer for reducing the mean access time, FIG. 2 shows a schematic sketch of the logical arrangement of sector addresses in a buffer, FIG. 3 shows a physical arrangement of sectors in a track buffer according to an ascending storage address, FIG. 4 shows a schematic sketch concerning the relationship between the logical arrangement of the sectors and the control thereof, FIG. 5 shows a schematic sketch of an exemplary allocation of a track buffer, FIG. 6 shows a table for illustrating alterations of the allocation of the track buffer in the initialization phase, FIG. 7 shows a table for illustrating alterations of the allocation of the track buffer in the initialization phase with representation of the concatenation, FIG. 8 shows a table for illustrating alterations of the allocation of the track buffer with additional variables, and FIG. 9 shows a table for illustrating alterations of the allocation of the track buffer with an altered entry point.

FIG. 1 illustrates the block diagram of a reproduction apparatus having a buffer for reducing the mean access time to an information carrier. The reproduction apparatus is a DVD reproduction apparatus, for example, in which, by means of a pick-up PU, also referred to as a read head, sectors S of the optical information carrier are scanned and provided via a track buffer TB, used as buffer or cache, to an application memory AM, which is also used for controlling the track buffer TB in this exemplary embodiment. In order to request sector numbers PSN of the information carrier, a control unit CU is provided, which controls the pick-up PU for finding the sector S required by an application.

If an application in the application memory AM requests the reading of a sector S, the application initially looks up in a control table CS in the application memory AM to see whether the sector S is already present in the track buffer TB. If the sector S is not present in the track buffer TB, the application communicates a command for reading the sector S to the control unit CU, which issues to the pick-up PU a sector read command for reading the sector S with the correspondingly predetermined physical sector number PSN. The pick-up PU jumps to the corresponding location of the optical information carrier and reads this sector S, carries out an ECC decoding and writes the sector S to a free sector S of the track buffer TB. This ensures that the requested sector S is situated in the track buffer TB, which is then accessed a number of times in order to reduce the mean access time. The application in the application memory AM then accesses this sector S stored in the track buffer TB.

For controlling the allocation of the track buffer TB and for finding sectors S stored in the track buffer TB, the control table CS provided in the application memory AM contains a row or series of endlessly concatenated place holders PH and three variables la, lf and lu.

For writing sectors S to the track buffer TB and for a multiple access to a sector S in the track buffer TB, a track buffer TB is provided which, as illustrated in FIG. 2, comprises logically concatenated storage locations. Each storage location is assigned a place holder PH with which the track buffer TB is logically divided into three regions, a region AS for allocated sectors S, a region FS for released sectors S and a region US for unallocated sector locations. Sectors S in the region AS of allocated sectors S are sectors S which are used by an application in the application memory AM. Sectors S in the region FS of released sectors S are not used by any application in the application memory AM and as yet no sectors have been read into the regions US of unallocated sector locations by the pick-up PU. The region US of unallocated sector locations generally represents only an initial state, since gradually there are ever fewer unallocated storage or sector locations available and the track buffer TB finally only comprises a region AS of allocated sectors S and a region FS of released sectors S. A logical combination of the place holders PH is provided, which, by means of corresponding numbering, takes account of the successive regions AS, FS and US, so that a regions AS for allocated sectors S which extends from 0 to k−1 is followed by a region FS of k to m−1 for released sectors S and a region US of m to n−1 for unallocated sector locations. With the concatenation provided, every sector location, in a ring arrangement, has a logical next sector location. However, as illustrated in FIG. 3, this logical next sector location need not necessarily be the next sector location in physical terms as well. In principle, however, the first sector S in the region AS is the temporally last allocated sector S, the second sector S in the region AS is the temporally penultimate allocated sector S, etc. and the last sector S in the region of allocated sectors AS points to the first sector S in the region FS for released sectors FS. The first sector S in the region FS for released sectors S is the temporally last released sector S, the second sector S in the region FS for released sectors S is the temporally penultimate released sector S, etc. and the last sector S in the region FS for released sectors S points to the first sector S in the region US for unallocated sector locations.

The sectors S in the region US for unallocated sector locations do not require a particular order. A simple order would be, for example, the physical arrangement in the memory, i.e. an order according to an ascending storage address. However, in order to close the ring, the last sector S in the region US for unallocated sector locations must point to the first sector S in the region AS of allocated sectors S.

A physical arrangement of the sectors S in the track buffer TB according to an ascending storage address, i.e. the physical arrangement of the sectors S in the track buffer TB, is illustrated in FIG. 3. In FIGS. 2 and 3, the logical combination of the individual sectors S is symbolized by arrows. The physical order of the sectors S, which is $0<r<r+1<s<s+1<t<u$, for example, deviates from the logical order of the sectors S, which is identified by $0<k-1<k<m-1<m<n-1$. The relationship between the logical order of the sectors S and the physical arrangement thereof in the track buffer TB, which also makes it possible to find the storage location assigned to a sector number in the track buffer TB, is realized by a control table CS which is provided in the application memory AM and contains the variables la, lf, lu. As illustrated in an example in FIG. 4, the first variable la comprises the storage address index of the first allocated sector S in the track buffer TB, the second variable lf comprises the storage address index of the first released sector S in the track buffer TB, while the third variable lu designates the storage address index of the first unallocated sector location S in the track buffer TB. In this exemplary embodiment, the respective first sector S in the regions AS, FS and US is chosen as entry point into the respective region AS, FS, US. In accordance with one embodiment, the number of sectors S in the regions AS, FS and US can be specified with additional variables na, nf and nu, which, however, are not necessary in principle if the variables la, lf, lu are given the opportunity to show that they do not identify a valid index value. In the example specified in FIG. 4, the number of allocated sectors S is equal to seven, resulting in a corresponding variable na=7. The variables nf and nu correspondingly identify the number of sectors S in the region FS and in the region US, here being nf=6 and nu=7. The relationship between a logical order LOR of the sectors S and a physical order of the sectors S according to an ascending storage address in the track buffer TB, as is represented in the control table CS with the corresponding place holder number PHN, is illustrated in the lower region of FIG. 4. Arrows and number are used to illustrate the assignment. In accordance with the embodiment illustrated, use is made of a storage address indexing 0 to 19 whose consecutive numbering corresponds to the consecutive numbering 0 to 19 of the logical order LO of the place holders or sectors S, thereby producing a combination between the storage location or its storage address index and a subsequent entry with the index next to the next sector S or place holder PH. By way of example, let the value of the variable lf, which identifies the location of the first sector S in the region FS of released sectors S, be lf=6, so that this determines that the first sector S of the region FS of released sectors S is situated at the place holder number PHN=6. This is the number 7 in the logical order LOR. The entry at the place holder number PHN=6 or the index next which points to the subsequent place holder PH is next: 9. At the place holder number PHN=9, the number of the logical order LOR is the number 8, so that a logical combination of the sectors S stored in the track buffer TB is thereby produced despite a physical disorder.

The conditions under which the entries next: x need not be altered and the cases in which the entries next: x are altered will be illustrated with reference to examples illustrated in FIGS. 6 to 9.

Figure 7:
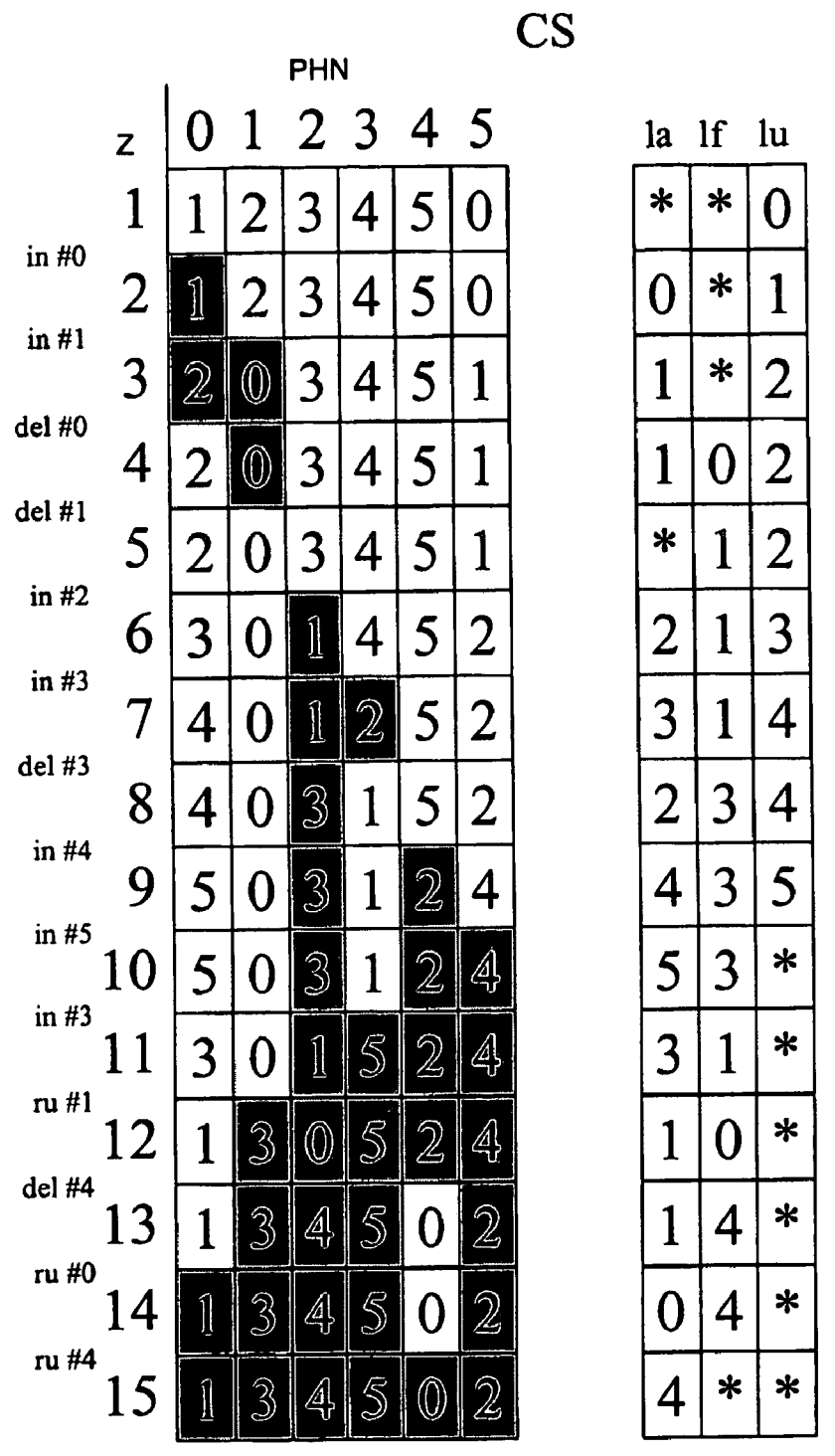

FIGS. 6 to 9 illustrate two tables which demonstrate by way of example the allocation of the track buffer TB with six storage locations and the corresponding mapping in the series of place holder numbers PHN in the control table CS over a period of time running from top to bottom. Each of the rows Z from 1 to 15 corresponds in each case to a change in the allocation of the track buffer TB, which, in accordance with the examples illustrated in FIGS. 6 to 9, is intended to have six place holders PH with the place holder numbers PHN 0 to 5. Since the index of the sectors S, in a loop, is always intended to point to the following sector S, what is expediently chosen as a starting point for the place holders PH is an indexing next which beings with a one, rises consecutively and has a zero at the end of the series of place holders PH, as illustrated in the first row Z=1 in FIGS. 7 and 8. Since, at the beginning, no sector S has yet been written to the track buffer TB and none of the place holders PH is allocated, the result for the variables la, lf, lu, na, ng, nu illustrated in FIG. 8 is that, except for the variable nu, which specifies the number of unallocated sectors S by nu=6, all the other variables la, lf, lu, na, nf are equal to zero. Row Z=2 of the tables specifies that, at the place holder PHN=0, a sector S was written to the track buffer TB, which receives the index 1. In the control table CS, which contains the corresponding storage address index as first three variables la, lf, lu, that is then mapped in such a way that la=0, since the sector S is stored at the place holder number PNH=0. The first released sector S, which is intended to follow the region AS of allocated sectors is then the sector S which is situated at the place holder number PNH=1. However, the place holder number PHN=1 is also the first unallocated sector S, so that the variable lu is likewise lu=1. The number of allocated sectors S is equal to one and is represented by the variable na=1. No sector S has hitherto been stored in the region FS of free sectors S, so that the number of the variable nf is correspondingly nf=0. By virtue of the fact that a sector has been written to the track buffer TB, the number of sectors S in the region US of unallocated sector locations has decreased to five in accordance with the variable nu=5, which can also be determined by the equation nu=6−na−nf. In the third row Z=3, a sector S has again been written to the track buffer TB, which receives the index 0 on account of the concatenation provided. The index next of the sector S previously written in becomes next=2 since the first released or unallocated sector S is now situated at the place holder number PHN=3. The variable la=1 in the third row specifies that the first allocated sector S is situated at the location with the place holder number PHN=1. The entry index next: 0 of the next place holder PH at the place holder number PHN=2 specifies that the next allocated sector S is situated at the place holder number PHN=0. As a result, the logical combination of the sectors S is produced and the writing of sectors S at unallocated or released storage locations is controlled and access to the sectors S is also enabled, even though logically they are arranged in a single row. In FIGS. 6 to 9, the transitions of the alterations of the allocation of the place holders PH are specified by designations in#, del#, ru# exclusively for explanation purposes. A numeral following the designations in#, del#, ru# identifies the place holder number PHN to which the alteration relates. In detail, the designations in#, del#, ru# identify:

Designation in# specifies that a sector S is written to the track buffer TB at the place holder number PHN specified by the following numeral.

The designation ru# specifies that a sector S still contained in the track buffer TB is used again, and the designation del# specifies that the corresponding sector S, at the location identified by the place holder number PHN with the numeral, is no longer used by any application. However, this sector S is not erased from the track buffer TB, but rather is preserved therein until it is overwritten by a new sector S or is used again.

Since the total number of sectors S in the track buffer TB is known, being 6 in this example, it holds true in principle that na+nf+nu=6. The system thus contains redundancy. In other words, one of the three variables na, nf, nu in the exemplary embodiment in accordance with FIG. 8 can be omitted. By way of example, the variable nu can be completely replaced by the formula nu=6−na−nf.

FIG. 6 specifies an exemplary embodiment in which those variables na, nf and nu which identify the number of sectors S in the regions AS, FS, US are not necessary. By the same token, the three variables la, lf and lu are given the opportunity to indicate that they do not identify a valid index value. Such states are identified by an asterisk * in FIGS. 6, 7 and 9. This asterisk * can be realized e.g. in that a value which does not correspond to a possible index value, that is to say all values except for the 1, 2, 3, 4 and 5 used, indicates that this variable is invalid. Thus, in the examples, the asterisk * could be realized e.g. by the number −1 or 6. This exemplary embodiment therefore also represents one of the preferred embodiments since the initialization of the next pointers of the as yet unallocated place holders PH is additionally dispensed with. This is identified by empty place holders PH in FIG. 6 and in FIG. 9. The initialization of the as yet unallocated place holders PH can be omitted if use is made of the rule that, in the event of a new allocation of an as yet unallocated placed holder PH, in principle the place holder PH with the lowest index is used. For the example in FIG. 6, this means that the unallocated place holders PH are to be allocated from left to right. Only the next pointer of a newly allocated place holder PH is initialized. This procedure obviates a time-consuming initialization of all the place holders PH upon new creation of the control table CS. Nevertheless, fundamentally there is no departure from the principle of the concatenated place holders PH. This is illustrated in FIG. 7, which is identical to FIG. 6 except for the difference that the allocation or the indices of the unallocated place holders PH are specified.

The proposed solution is a buffer with a reduced extent of necessary storage space for controlling the buffer, and it is even possible to switch off the cache dynamically.

A description is given above of a special sector cache method which is based on a row of place holders PH which indicates a place holder PH in the cache for each sector S. Each place holder PH comprises a pointer to the location of its sector S in the cache and the index of the next place holder PH in the row of place holders PH, resulting in a closed chain which is realized with index values assigned to place holder numbers PHN.

The method proposed requires only the setting-up of the place holders PH and the three variables la, lf and lu. It is necessary merely to allocate memory for the place holders PH, a 4-byte word, for example, being sufficient for a place holder PH, and it is necessary to initialize the variables la, lf and lu.

A practical exemplary embodiment of the allocation of the track buffer TB in a DVD reproduction apparatus is illustrated in FIG. 5. The sectors S illustrated in FIG. 5 contain files of a DVD data stream recorded on a DVD. By way of example, if an application has requested first the file VIDEO_TS.IFO in the sub-directory VIDEO_TS of an application and then the file VTS_01.0.IFO in the same directory, then the file manager representing the application must look up twice in the same directory VIDEO_TS to find out where this file VIDEO_TS.IFO is situated. In this case, the cache can avoid repeated access to the pick-up PU by the application first looking up in the cache to see whether the directory VIDEO_TS is still present there. If so, the application can then directly access the sector S of the directory in the track buffer TB. The access to the corresponding sectors S in the track buffer TB is faster than the access via the pick-up PU and the mean access time is reduced.

FIG. 9 specifies a further exemplary embodiment, in which a sector S preceding the region AS, FS, US is used as entry point into the regions AS, FS and US. The variables la, lf, lu, which identify the first sector S in the respective region AS, FS, US in the other exemplary embodiments, here point with their entry to the respective last sector S or place holder PH in the preceding region AS, FS, US. This reduces the number of jumps required for alteration of the indexes in the series of place holders PH, as becomes clear for example in the transition of the allocation of the place holders PH in row Z=10 to an allocation of the place holders PH corresponding to row Z=11. The embodiments described here are specified only as examples and a person skilled in the art can realize other embodiments of the invention which remain within the scope of the invention.

The invention claimed is:

1. A reproduction apparatus having a buffer for reducing the mean access time to an information carrier, wherein, for writing sectors to the buffer and for finding sectors in the buffer, a control table including a number of place holders and variables is provided and each of the place holders point with an index to a subsequent place holder in a single endless chain of place holders divided into a plurality of regions including a region for allocated sectors, a region for released sectors and a region for unallocated sectors, such that a sector in the region for allocated sectors or the region for released sectors, for which one of the variables respectively identifies a predetermined entry point into one of the regions, is preserved for finding sectors in the buffer.

2. The reproduction apparatus according to claim 1, wherein the control table is arranged in an application memory.

3. The reproduction apparatus according to claim 1, wherein the place holders are provided in the sectors written to the buffer.

4. The reproduction apparatus according to claim 1, wherein the buffer is a track buffer.

5. The reproduction apparatus according to claim 1, wherein the variables and only the place holder with the lowest index (next) are initialized in an initialization phase of the control table.

6. The reproduction apparatus according to claim 1, wherein, in the case of an arrangement of the place holders in an application memory, each storage location of the buffer is assigned a place holder.

7. The reproduction apparatus according to claim 1, wherein a first one of the variables is provided for pointing to a first sector in region for allocated sectors, a second one of the variables is provided for pointing to a first sector in the region for released sectors, and a third one of the variables is provided for pointing to a first sector in the region for unallocated sectors.

8. The reproduction apparatus according to claim 1, wherein sectors in the region for unallocated sectors are provided in a manner deviating from a chained order, with the exception of a last sector in the region for unallocated sectors, which points to a first sector in the region for allocated sectors.

9. The reproduction apparatus according to claim 1, wherein sectors in the regions are chained with one another in an order corresponding to the temporal order in which they were written to the buffer.

10. The reproduction apparatus according to claim 1, wherein in each case the sector or place holder which precedes the respective region in the chain and is a last sector of a preceding region is provided as a predetermined entry point into one of the regions with one of the variables.

11. The reproduction apparatus according to claim 1, wherein in each case a sector which is situated after a predetermined number of sectors or place holders in the order of the sectors in the respective region is provided as a predetermined entry point into one of the regions with one of the variables.

12. The reproduction apparatus according to claim 1, wherein the sectors read from the information carrier are sorted in the three regions in the temporal order in which they are transported into the buffer.

13. A reproduction apparatus, comprising:
a buffer;
a control table for writing sectors to the buffer and for finding sectors in the buffer, said control table including a plurality of place holders wherein each of the place holders point with an index to a subsequent place holder in a single endless chain of place holders; and
wherein the single endless chain of place holders is divided into a plurality of separate regions including a region for allocated sectors, a region for released sectors and a region for unallocated sectors.

14. The reproduction apparatus according to claim 13, wherein sectors are sorted in the three regions in the temporal order in which they are transported into the buffer.

* * * * *